March 22, 1966     E. R. HATTENDORF     3,241,792
PROGRAMMED ANGLE OF ATTACK CONTROL SYSTEM FOR AIRCRAFT
Filed Jan. 23, 1964     3 Sheets-Sheet 1

INVENTOR.
EDWIN R. HATTENDORF
BY *Moody & Anderson*
AGENTS

March 22, 1966 E. R. HATTENDORF 3,241,792
PROGRAMMED ANGLE OF ATTACK CONTROL SYSTEM FOR AIRCRAFT
Filed Jan. 23, 1964 3 Sheets-Sheet 2

INVENTOR.
EDWIN R. HATTENDORF
BY
Moody & Anderson
AGENTS

United States Patent Office 3,241,792
Patented Mar. 22, 1966

3,241,792
PROGRAMMED ANGLE OF ATTACK CONTROL SYSTEM FOR AIRCRAFT
Edwin R. Hattendorf, Cedar Rapids, Iowa, assignor to Collins Radio Company, Cedar Rapids, Iowa, a corporation of Iowa
Filed Jan. 23, 1964, Ser. No. 339,696
6 Claims. (Cl. 244—77)

This invention relates generally to aircraft control and more particularly to an angle of attack control system for an aircraft.

The present invention provides means for exacting aircraft control using angle of attack as controlling parameter and providing an optimum angle of attack during rotation, climb-out, and go-around flight modes. The term "rotation" as used herein refers to initial pitch maneuver from the level or ground-run attitude of an aircraft which is instituted to effect lift-off when the aircraft reaches the proper air speed during the ground run.

The present invention has as a primary object thereof the provision of a flight control system with the maintenance of flight safety by programming angle of attack as a function of vertical speed throughout critical flight modes with advantageous utilization of excess thrust.

The present invention is featured in the automatic provision of angle of attack control under critical flight control modes to insure optimum thrust utilization and maintenance of safety margin during rotation and climb-out phases of flight with additional provision for optimizing engine thrust by angle of attack control in emergency procedures such as the loss of an engine after rotation and during the necessity for go-around as might be commanded during the landing phase of flight control.

A still further feature of the present invention is the provision of a control system by which the angle of attack for various critical flight modes is programmed and automatically utilized to provide a steering command signal for maintaining optimum control.

The above and still further objects and features of the present invention will become apparent upon reading the following description in conjunction with the accompanying drawings in which.

The present invention generates a pitch command signal for aircraft control. The pitch command signal is proportional to the discrepancy between a programmed angle of attack command signal and a position feedback signal taken from an angle of attack sensor. In general operation, an angle of attack command signal is generated by utilizing complemented vertical speed applied through a nonlinear shaping network. The shaped signal is combined with a flap position signal in a manner such that the correct angle of attack for any flap position is commanded. The programmed angle of attack command signal is compared with a feedback signal from an angle of attack sensor and the discrepancy therebetween becomes a pitch command steering signal. The angle of attack feedback signal is augmented before comparison with the programmed command signal to prevent phugoiding.

The significance of the general operational features of the invention may best be comprehended with a consideration of the thrust and drag curves for a typical aircraft. The programming feature of the invention will be directly related to the thrust and drag characteristics of an aircraft such that the resulting pitch command signal commands an optimum angle of attack for all normal flight conditions and additionally, under critical abnormal conditions, as, for example, in those situations where an engine might be lost on the take-off.

Figure 1:
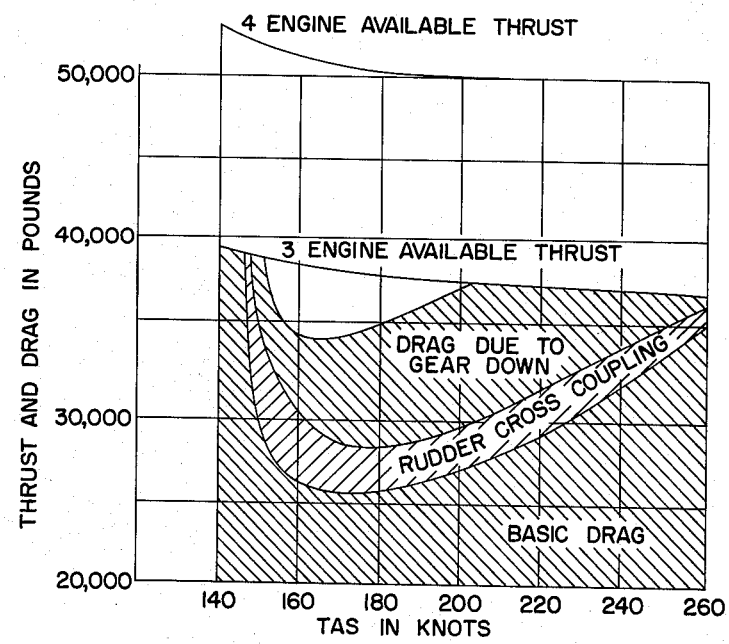
FIGURE 1 is a diagram of thrust and drag as a function of air speed for a typical four-engine jet aircraft.

The thrust and drag curves for a typical fully loaded four-engine jet transport using 30 degree flaps are shown in FIGURE 1. The four-engine and three-engine available thrust is seen to be relatively constant as a function of true air speed. The bottom area on the graph represents the basic drag of the aircraft when its attitude is in a position to hold the airplane in level flight at the particular air speeds. Basic drag increases with air speed and it also increases at lower air speeds because of the increased angle of attack required to give sufficient lift. The drag due to rudder cross-coupling occurs when loss of an engine requires application of rudder to counteract the unbalanced moment. The rudder induces this added drag along the longitudinal axis. The remaining area on the curve is the drag due to the landing gear and illustrates the pilot's interest in getting the gear up as quickly as possible. If an aircraft becomes airborne at too low an air speed and immediately loses an engine, available engine thrust is less than aircraft drag and the aircraft therefore will lose speed and come back down. The aircraft should not become airborne before reaching an air speed sufficient to maintain flight with loss of an engine. It should be pointed out that the drag curves of FIGURE 1 have been plotted as a function of air speed for a fully loaded jet. When plotted for a lighter aircraft, these curves would move downward and to the left along the air speed axis. If, however, these curves were plotted as a function of angle of attack, they would not shift along the angle of attack axis as a function of aircraft weight. Thus, angle of attack is a desirable parameter for controlling the aircraft pitch attitude during take-off and go-around, since for different aircraft weights the same angle of attack with maximize the available extra thrust for acceleration or climb. Currently, in most cases, the aircraft is rotated to a specific pitch attitude at take-off and maintained there for the initial phase of climb-out. This method does not give optimum rotation and climb-out, and suffers from gyro precession effects due to forward acceleration of the aircraft during take-off.

Again referring to the curves of FIGURE 1, one may define the optimum angle of attack for different phases of flight. On rotation, the angle of attack should be a value needed to hold up the airplane at the lower air speed, bearing in mind that one does not wish to come down on loss of an engine.

During normal climb-out with four-engine thrust available, an angle of attack giving an air speed appropriate to the thrust and weight of the aircraft is desired. However, during climb-out with loss of an engine, the pilot desires an angle of attack corresponding to the maximum lift-to-drag ratio. This would be the point on the curves of FIG. 1 where drag is minimum, making available a maximum excess thrust over that required to keep the airplane in level flight. The following equation suggests how this excess thrust can be used:

$$\frac{T-D}{W} = \gamma + \frac{\dot{U}}{g}$$

The equation states that thrust minus drag, divided by aircraft weight, gives a flight path angle, plus forward acceleration divided by the gravity vector $g$. Hence, excess thrust can be used to give a flight path angle (climb rate) or additional air speed through forward acceleration. Therefore, for engine-out operation during initial climb, the pilot would desire to get maximum climbout (maximum flight path angle), by assuming an angle of attack giving maximum excess thrust.

Assuming a go-around is required, the pilot is interested in reducing his altitude loss to a minimum. Since the aircraft has had adequate air speed during the approach phase, minimum altitude loss during the go-around maneuver can best be accomplished by assuming the maximum angle of attack which will give a safe margin above stall angle of attack. This will give maximum lift and quickly reduce rate of descent to zero, after which the pilot again can fly an angle of attack similar to that for climbout after rotation. By utilizing angle of attack information instead of air speed, maneuvers near stall can be made more safely since during transient conditions, air speed is not always an immediate indication of the margin remaining before stall condition is reached.

Figure 2:
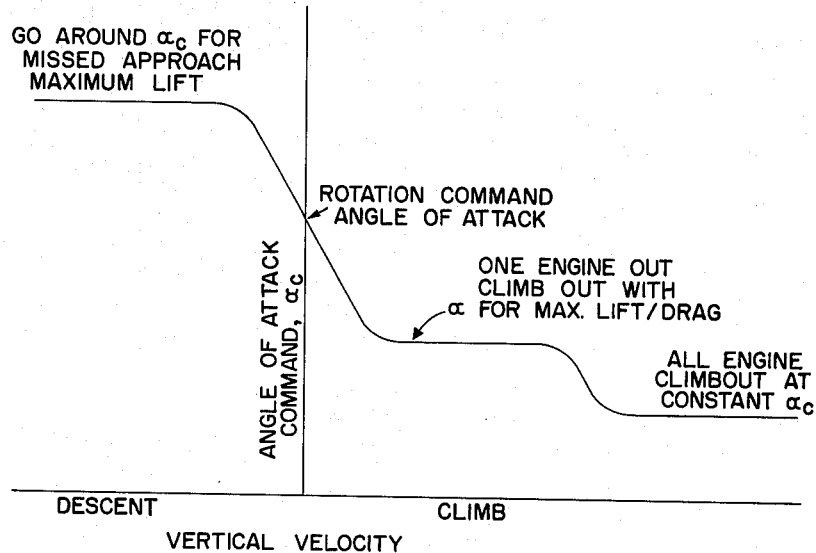
FIGURE 2 is a representation of the optimum angle of attack for critical flight modes in accordance with the present invention.

Having defined the optimum angles of attack for the various flight conditions, a method of generating this angle of attack command for use as a pitch command signal will now be considered. The curve shown in FIGURE 2 shows how these commands can be programmed as a function of the vertical velocity, $\dot{h}$, the same vertical velocity parameter previously discussed. The curve illustrates how at take-off (zero $\dot{h}$) an angle of attack (rotation angle of attack) sufficient to hold up the aircraft plus attain some small altitude rate is commanded. As altitude rate builds up, the aircraft quickly reaches the angle of attack corresponding to the maximum lift-to-drag ratio. This angle of attack allows the aircraft to accelerate to a higher air speed while continuing to pick up additional altitude rate. As the rate of climb continues to increase because of excess available thrust, the angle of attack is further decreased to that value desired for continuing the climb-out at some optimum combination of air speed and rate of climb. The operation at this lower angle of attack, which gives a less-than-maximum lift-to-drag ratio but a higher air speed, is a luxury the pilot can afford since he has excess thrust and his flight path angle is sufficiently large. In the event of an engine failure, the loss of thrust would result in reduced rate of climb and the aircraft would migrate back to the angle of attack corresponding to minimum drag and optimum climb-out angle.

In a go-around situation, it is assumed the airplane is descending down the glide slope beam or its extension with a rate of sink of 500 to 1000 feet per minute. Upon initiation of a go-around, a maximum safe angle of attack is commanded as shown on the left side of FIGURE 2. The go-around angle of attack is optimized to reduce the rate of descent rapidly and thereby minimize the altitude loss. This angle is maintained until the sink rate is reduced essentially to zero, after which the aircraft migrates to the same programmed angle of attack used for climb-out.

Figure 3:
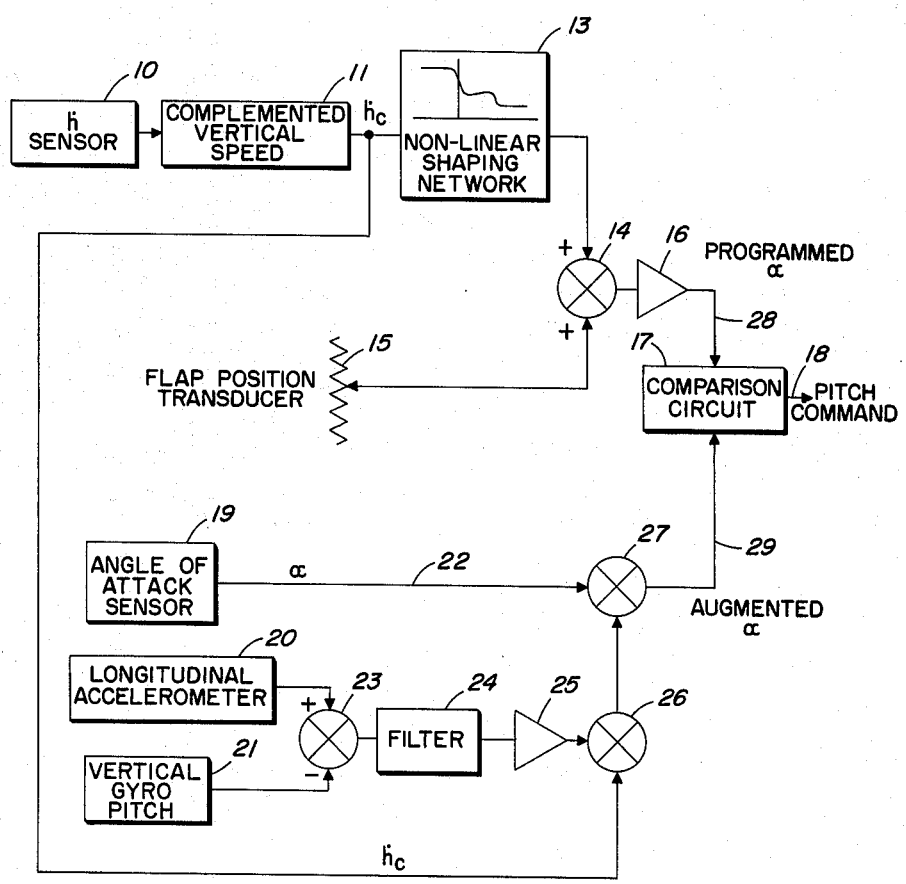
FIGURE 3 is a functional diagram of the control system of the present invention.

A functional diagram of an embodiment of the present invention is illustrated in FIGURE 3. The uppermost portion of the diagram illustrates the development of the programmed angle of attack signal $\alpha$. As previously discussed, the programmed angle of attack signal is developed from vertical speed and flap position input parameters. A vertical speed sensor 10 thus provides a signal $\dot{h}$ which is proportional to the rate of change of altitude. Since this sensor may, in all likelihood be a conventional bellows type of instrument, the $\dot{h}$ signal is applied to a complemented vertical speed circuit 11 from which is developed an improved signal $\dot{h}_c$ proportional to vertical speed. The function performed by circuitry 11 is that of improving the vertical speed signal from the sensor 10 such that the complemented output 12 is compensated for the lag within sensor 10 and has eliminated therefrom certain inherent noise perturbations which might result from aerodynamic noise, stiction noise, etc. For the purpose of the present invention, means as described in my copending application entitled "System for Development of Complemented Vertical Speed in Aircraft," Serial Number 339,703, filed concurrently with the present invention, would be preferred. Since the present invention generates an angle of attack command signal as a function of vertical speed, it is imperative that the vertical speed input parameter $\dot{h}$ be reliable.

The complemented vertical signal, $\dot{h}_c$, is applied to a nonlinear shaping network 13 the output of which is an angle of attack command signal which varies with the input vertical speed by a nonlinear relationship in accordance with the desired program as previously discussed with reference to the curve of FIGURE 2. Details of a particular embodiment of nonlinear shaping network 13 will be further discussed.

The output from shaping network 13 is applied as a first input to a mixer 14. The signal from a flap position transducer 15 is applied as second input to mixer 14, where it is added to the angle of attack command signal from network 13. A flap position signal is added to the angle of attack signal since the thrust-drag curves of FIGURE 1 are also a function of flap position. A change in flap position to a first approximation looks like a change in the angle of attack reference line. Thus by adding flap position from transducer 15 to the angle of attack command signal from network 13, the output of mixer 14 is a programmed angle of attack for any flap position.

As previously discussed, the angle of attack command signal is to be compared with angle of attack feedback for the development of a pitch steering command signal. Thus the programmed angle of attack command signal from mixer 14 may be applied through an amplifier 16 to a comparison circuitry 17 within which the programmed angle of attack signal command 28 may be compared with the angle of attack feedback signal.

Although as previously discussed, flying angle of attack is desirable, the command signal development must include proper damping or augmentation to prevent a phugoid oscillation. This phugoid oscillation causes cycling in altitude rate and air speed with very small changes in angle of attack. Without proper damping provisions, flight control demanding that a given angle of attack be held would result in phugoiding. Thus, in accordance with the present invention, the angle of attack feedback signal 29, which is compared with the programmed angle of attack signal command 28, is first augmented with a phugoid damping signal. An analysis of sources of phugoid damping; including altitude rate, longitudinal acceleration, Mach rate, and pitch, indicates that a vertical speed signal complemented by a longitudinal accelerometer signal provides good phugoid damping. Thus, with reference to FIGURE 3, angle of attack feedback from sensor 19 is applied as a first input 22 to mixer 27. A second input to mixer 27 is comprised of a phugoid damping signal developed within a further mixer 26. The phugoid damping signal from mixer 26 is derived by applying signals proportional to longitudinal acceleration from a longitudinal accelerometer 20 and pitch from vertical gyro 21 to a mixer 23, and applying the output of mixer 23 through a filter 24 and amplifier 25 as a first input to mixer 26. The second input to mixer 26 is the complemented vertical speed signal $\dot{h}_c$. The pitch signal from vertical gyro 21 is substraced from the acceleration signal from longitudinal accelerometer 20 in mixer 23, because the longitudinal accelerometer 20, having its sensitive axis in the forward position, picks up acceleration from the earth's gravity as the aircraft pitches. The modified accelerometer signal from mixer 23 is passed through high pass filter 24 to eliminate low frequency errors present in the pitch cancellation signal due to gyro precession during take-off. In this manner, the overall take-off system is not affected by the vertical gyro's precession errors. The output from filter 24 is combined with vertical speed $\dot{h}_c$ in mixer 26 to develop a phugoid damping signal which is combined with the feedback angle of attack signal 22 within mixer 27 to develop the augmented angle of attack feedback signal 29 for comparison with the programmed angle of attack signal command as shaped within network 13.

Figure 4:
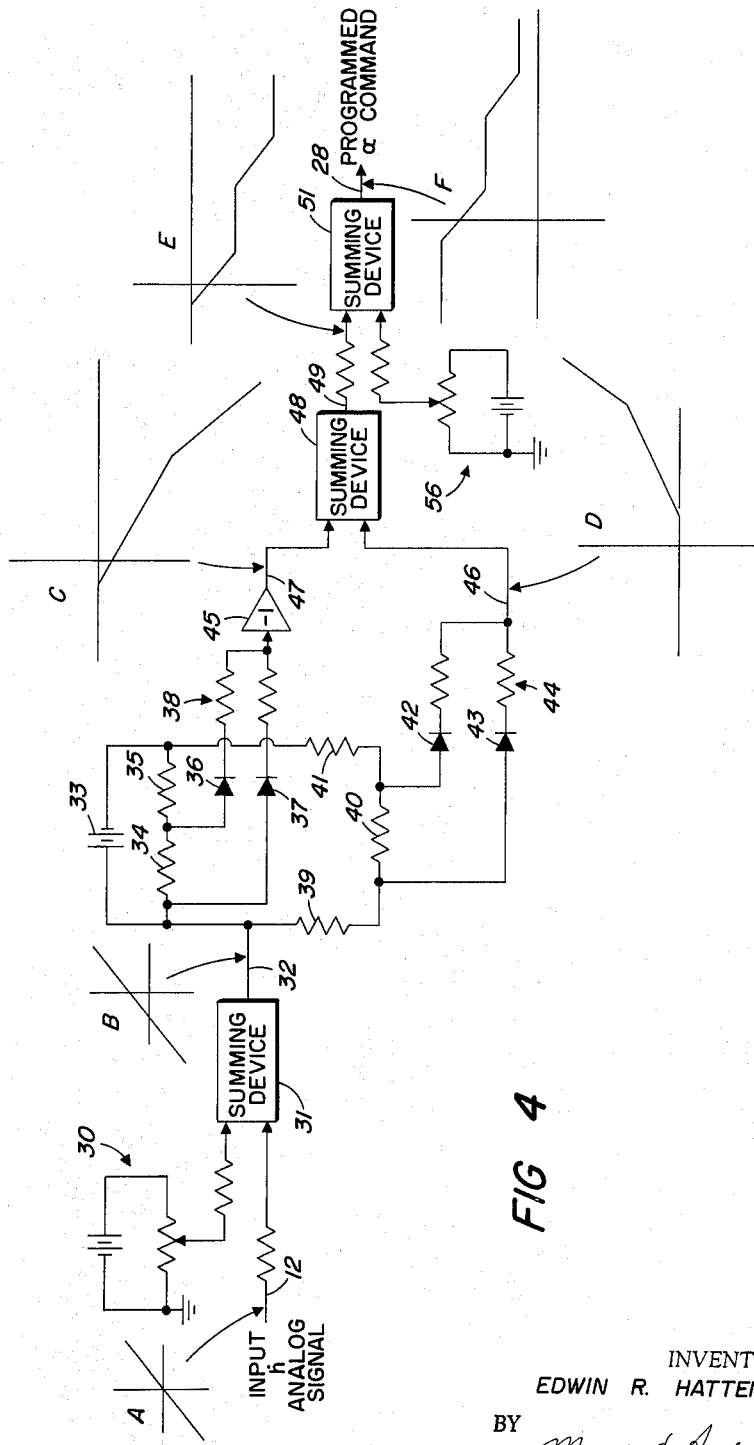
FIGURE 4 is a functional diagram of a type of shaping network for utilization in the system of FIGURE 3 by which the angle of attack control signal may be optimized as an automatic function of vertical speed.

FIGURE 4 represents a functional schematic diagram of a nonlinear shaping network 13 which may receive the input vertical speed signal $\dot{h}_c$ from complementing circuitry 11 and develop therefrom a nonlinear characteristic in accordance with that previously described and shown in FIGURE 2. With reference to FIGURE 4, the input altitude rate or vertical speed signal 12 is a linear analogue function A as illustrated. Vertical speed signal 12 is applied to a summing device 31, which receives a bias voltage from a direct current voltage supply 30 to develop an output 32 as illustrated in transfer characteristic B. The output from summing device 31 is applied to a diode shaping network comprising diodes 36, 37, 42 and 43 and a D.C. voltage bias supply 33 across which are connected a first voltage dividing network comprised of resistors 34 and 35 and a second voltage divider network comprised of resistors 39, 40 and 41. The anode of diode 36 is connected to the junction between resistors 34 and 35. The anode of diode 37 is connected to the positive terminal of bias supply 33. The cathodes of diodes 36 and 37 are connected to the ends of an adding network 38. The anode of diode 42 is connected to the junction between resistors 40 and 41 while the anode of diode 43 is connected to the junction between resistors 39 and 40. The cathodes of diodes 42 and 43 are connected to the ends of an adding network 44. In operation, the analog input signal is combined with the bias from source 30 in summing device 31 to produce an output 32 in accordance with function B. Output 32 is negative for negative input signals in excess of the level set by bias source 30. Due to the diode polarities in the succeeding diode shaping network, negative signals at 32 are not passed; the output 49 from summing device 48 is zero, and the α command output 28 is a constant determined by bias source 56. At the point where output 32 from summing device 31 becomes positive, the diode shaping network passes signal due to the conduction of diode 37. The output of diode 37 is applied through adding network 38 to an inverter-amplifier 45 which might be an operational amplifier performing the function of multiplying the input thereto by (—1). The first negative-slope portion of the output of inverter-amplifier 45, as illustrated in transfer characteristic C, is attributed to the conduction of diode 37. Diode 43 begins to conduct when the output from summing device 31 (characteristic B) exceeds the bias voltage applied to diode 43 by the D.C. bias supply 33 through the voltage dividing action of resistors 39, 40 and 41. The conduction of diode 43 provides the first positive slope of the output from summing network 44 (characteristic D). When diode 43 conducts its output substracts from the output of diode 37 due to the inversion by inverter-amplifier 45. The subtraction is realized within summing device 48 such that the output 49 thereof (characteristic E) has no further increase in output until diode 36 in the shaping network conducts. Diode 36 with bias supplied from the voltage divider 34–35 across bias supply 33 contributes the final negative slope of the characteristic E. The conduction of diode 42 at a still greater value of input to the shaping network (characteristic B) results in a cancellation of any further output from diode 36, thus providing the final flat portion on characteristic E. Characteristic E is then combined with a further D.C. bias from biasing supply 56 in a summing device 51 to develop the output angle of attack command signal (characteristic F). The nonlinear shaping network 13 of the invention, as embodied in FIGURE 4, is thus seen to provide an angle of attack command signal which varies nonlinearly as a function of vertical speed and which may be shaped so as to be optimized for a particular aircraft by judicious choice of the various voltage dividing networks and bias supplies embodied in the shaping network 13.

The output from the shaping network 13, as previously discussed, is combined with flap position feedback signal from transducer 15 to arrive at a programmed angle of attack command signal for comparison with the feedback signal from angle of attack sensor 19 so as to develop the output pitch command signal 18 for aircraft control purposes.

The present invention is thus seen to provide a control system for an aircraft utilizing a programmed angle of attack command signal for control which may be optimized for a particular aircraft under all conditions of load and for all flap positions. An exacting vertical control signal is thus provided which assures during various flight modes, the proper angle of attack to optimize available engine thrust with maintenance of an assured safety margin.

Although the present invention has been described with respect to a particular embodiment thereof, it is not to be so limited as changes might be made therein which fall within the scope of the invention as defined in the appended claims.

I claim:

1. An automatic control system for aircraft vertical guidance whereby aircraft pitch attitude is controlled to maintain aircraft angle of attack as a predetermined function of aircraft vertical velocity comprising: a source of signal proportional to aircraft vertical velocity, a nonlinear signal shaping network receiving said vertical velocity signal and developing therefrom an output signal the magnitude of which varies as a function of aircraft vertical velocity in a predetermined nonlinear manner, an angle of attack feedback signal taken from an angle of attack sensor, first signal comparison means receiving and differentially combining said feedback signal and the output of said shaping network, the magnitude and sensing of the output from said first signal comparison means being respectively definitive of the extent and direction of a change in aircraft pitch attitude necessary to effect a predetermined angle of attack in response to a particular aircraft vertical velocity as a programmed function determined by the characteristic of said signal shaping network.

2. A control system as defined in claim 1 further comprising a third signal developed by a flap position transducer and means for combining said third signal with the output of said shaping network prior to application thereof to said first signal comparison means, the output of said first signal comparison means thereby being a pitch command signal modified to maintain said programmed angle of attack control function as defined by said signal shaping means for any flap position.

3. A control system as defined in claim 2 further comprising means for augmenting said angle of attack feedback signal prior to application to said first signal comparison means, said means comprising a second signal comparison means receiving and differentially combining a signal proportional to aircraft longitudinal acceleration and a signal proportional to aircraft pitch attitude, first signal adding means receiving the output from said second signal comparison means and said signal proportional to aircraft vertical velocity, second signal adding means receiving the output from said first signal adding means and said angle of attack feedback signal, and the output of said second signal adding means being differentially combined with the output from said shaping network within said first signal comparison means.

4. A control system as defined in claim 3 further including a high pass filter receiving the output from said second signal comparison means and having an output connected to said first signal adding means.

5. A control system as defined in claim 4 wherein said signal shaping network comprises a signal translating means developing an output signal the magnitude of which varies as a predetermined nonlinear function of aircraft vertical velocity, the translating characteristic of said translating means being defined as a first constant function of maximum amplitude in response to a predetermined range of aircraft descent velocities, a second substantially linear negative-slope function for values of vertical velocity corresponding to a range of descent and climb velocities substantially symmetrical about a zero value of vertical velocity, a third constant function of intermediate magnitude in response to a predetermined range of increasing aircraft climb velocities, a fourth linear negative-slope function in response to a predetermined range of further increasing climb velocities, and a final constant and minimum magnitude output in response to still further increasing climb velocities.

6. A control system as defined in claim 5 wherein the transfer characteristic of said shaping network is formulated in accordance with the thrust-drag characteristic of a particular aircraft in a manner to optimize available engine thrust, said constant maximum magnitude function commanding a maximum angle of attack for maximum aircraft lift, said intermediate magnitude constant function commanding an angle of attack to effect maximum lift-to-drag ratio under conditions of loss of engine during climb-out, said minimum magnitude constant function commanding an angle of attack for optimizing climb-out under full engine performance, and said characteristic commanding an angle of attack appropriate for rotation command in response to zero vertical velocity.

References Cited by the Examiner

UNITED STATES PATENTS 2,842,324  7/1958  Jude et al. _____ 244—77

FERGUS S. MIDDLETON, *Primary Examiner.*